United States Patent
Robinson

(12) 
(10) Patent No.: US 10,786,072 B1
(45) Date of Patent: Sep. 29, 2020

(54) BRUSH WITH RETRACTABLE BRISTLES

(71) Applicant: Jesse L. Robinson, Omaha, NE (US)

(72) Inventor: Jesse L. Robinson, Omaha, NE (US)

(*) Notice: Subject to any disclaimer, the term of this patent is extended or adjusted under 35 U.S.C. 154(b) by 78 days.

(21) Appl. No.: 15/905,597

(22) Filed: Feb. 26, 2018

Related U.S. Application Data

(60) Provisional application No. 62/464,088, filed on Feb. 27, 2017.

(51) Int. Cl.
| | |
|---|---|
| *A46B 7/02* | (2006.01) |
| *A46B 17/06* | (2006.01) |
| *A46B 13/00* | (2006.01) |
| *A46B 9/10* | (2006.01) |
| *A46B 7/10* | (2006.01) |
| *A46B 13/02* | (2006.01) |
| *A01K 13/00* | (2006.01) |
| *A46B 9/02* | (2006.01) |

(52) U.S. Cl.
CPC ............ *A46B 7/023* (2013.01); *A01K 13/002* (2013.01); *A46B 7/10* (2013.01); *A46B 9/023* (2013.01); *A46B 9/10* (2013.01); *A46B 13/001* (2013.01); *A46B 13/02* (2013.01); *A46B 17/06* (2013.01); *A46B 2200/104* (2013.01); *A46B 2200/1093* (2013.01)

(58) Field of Classification Search
CPC .......... A46B 7/02; A46B 7/023; A46B 7/026; A46B 7/10; A46B 9/023; A46B 9/08; A46B 9/10; A46B 13/00; A46B 13/001; A46B 13/02; A46B 17/04; A46B 17/06; A46B 2200/10; A46B 2200/104; A46B 2200/1093; A01K 13/001; A01K 13/002; A45D 24/007; A45D 24/30; A45D 24/42
USPC ................... 15/23, 169, 184, 185, 201, 203; 132/119.1, 119, 120, 121; 119/608, 609, 119/627–629

See application file for complete search history.

(56) References Cited

U.S. PATENT DOCUMENTS

| | | | | |
|---|---|---|---|---|
| 1,189,698 | A * | 7/1916 | Keating | A46B 7/023 15/184 |
| 3,019,463 | A * | 2/1962 | Mitchell | A46B 13/02 15/23 |
| 3,150,393 | A * | 9/1964 | Crookes | A46B 13/02 15/23 |
| 3,427,674 | A * | 2/1969 | Simon, Jr. | A46B 13/02 15/23 |
| 3,431,571 | A * | 3/1969 | Kraus | A46B 13/02 15/23 |

(Continued)

FOREIGN PATENT DOCUMENTS

| | | | |
|---|---|---|---|
| DE | 2923740 | * | 12/1980 |
| DE | 3602052 | * | 7/1987 |
| EP | 185284 | * | 6/1986 |

*Primary Examiner* — Mark Spisich
(74) *Attorney, Agent, or Firm* — Suiter Swantz pc llo

(57) ABSTRACT

The invention takes advantage of an elasticity of brush bristles and an axial movement of the brush assembly with respect to a brush housing to configure the brush in a retracted or an expanded position. The brush with retractable bristles allows for both an easy removal of hair and/or debris on the bristles simply by the axial movement of the brush assembly and a replacement of the brush bristles when the brush bristles are damaged or dirty. The brush with retractable bristles is configured to be used with an electric tool which enables a rotation of the brush.

15 Claims, 4 Drawing Sheets

(56) References Cited

U.S. PATENT DOCUMENTS

| | | | | |
|---|---|---|---|---|
| 4,191,200 | A | * | 3/1980 | Renda ................... A45D 20/50 132/123 |
| 6,158,073 | A | * | 12/2000 | Jiovanni .............. A46B 13/001 15/23 |
| 6,631,831 | B1 | * | 10/2003 | Loiselle ................ A46B 17/06 132/119 |
| 8,281,449 | B1 | * | 10/2012 | Skaare ..................... A46B 7/02 132/229 |
| 8,302,246 | B2 | * | 11/2012 | Chudzik ............... A46B 7/023 132/119 |
| 2003/0192564 | A1 | * | 10/2003 | Johnson .................. A45D 1/04 132/119.1 |
| 2010/0200011 | A1 | * | 8/2010 | Wynne .................. A46B 7/023 132/120 |
| 2014/0059793 | A1 | * | 3/2014 | Rubio Bueno .......... A46B 3/18 15/184 |

\* cited by examiner

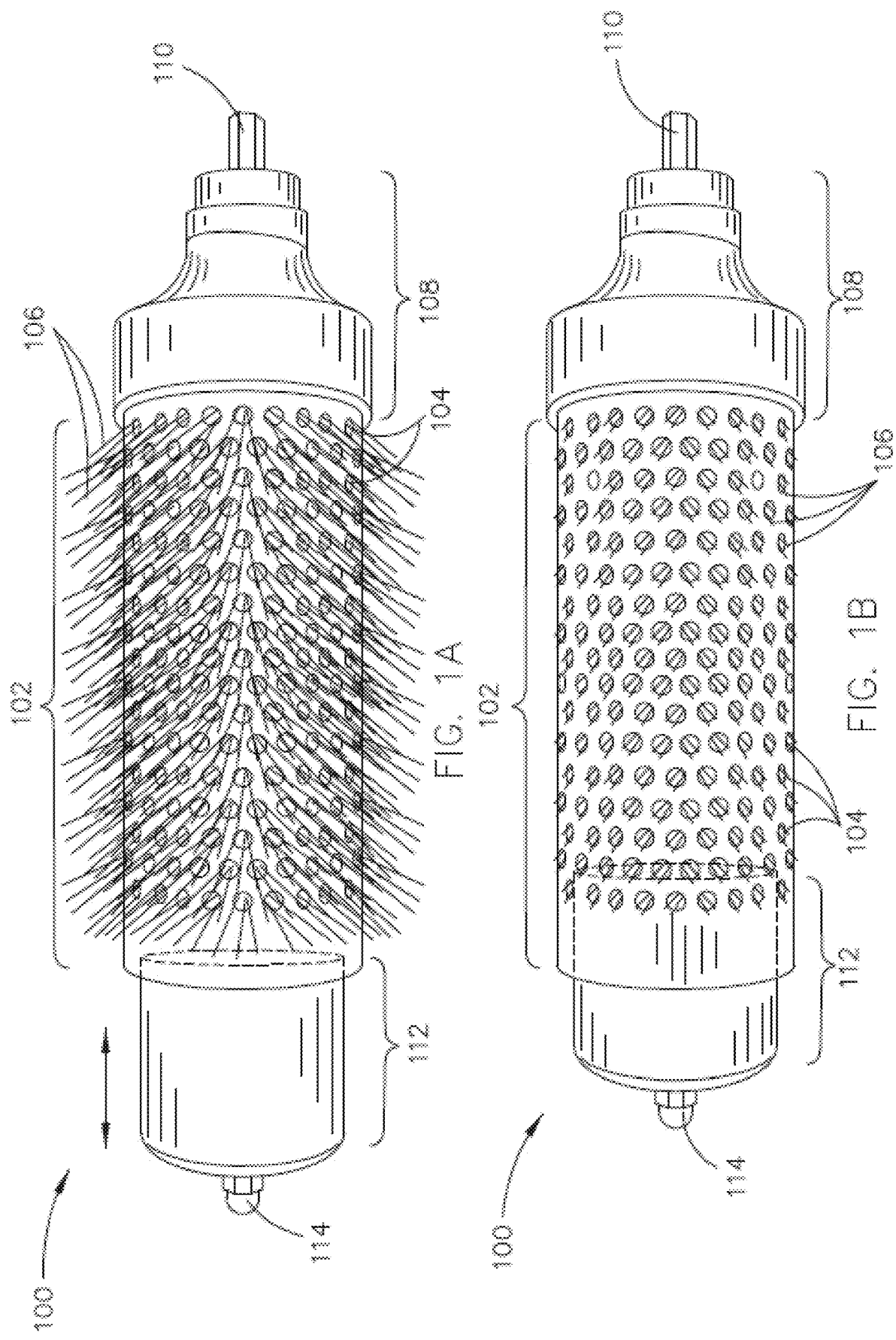

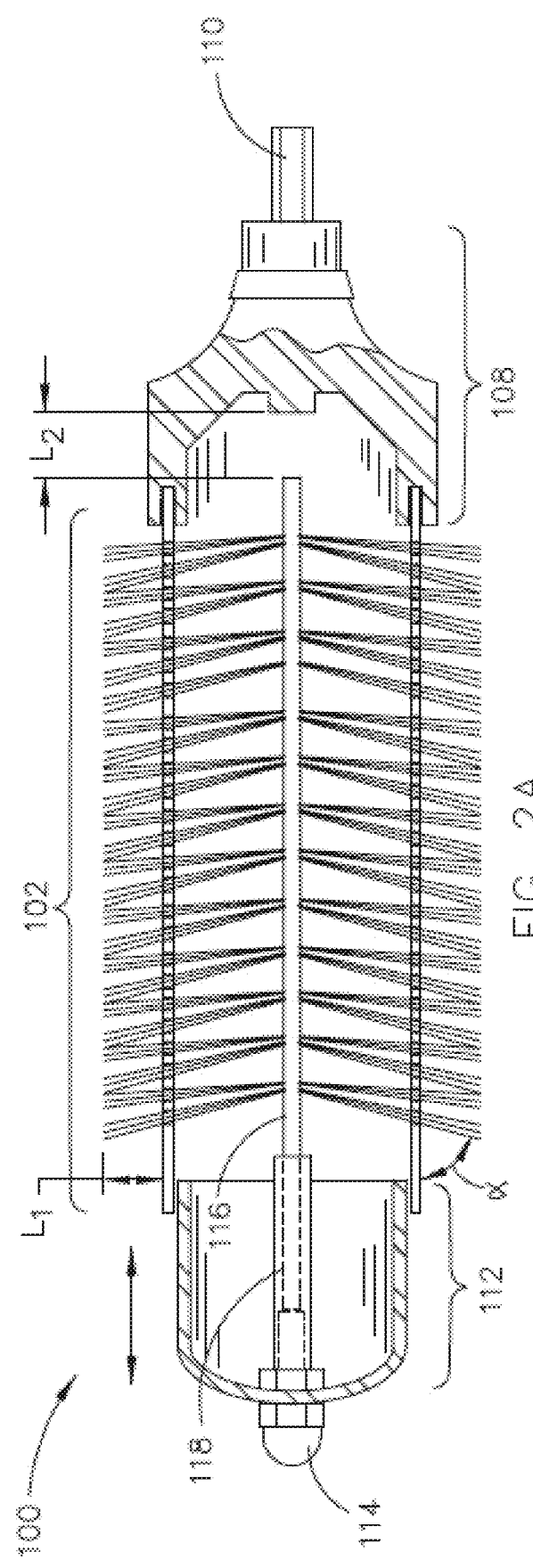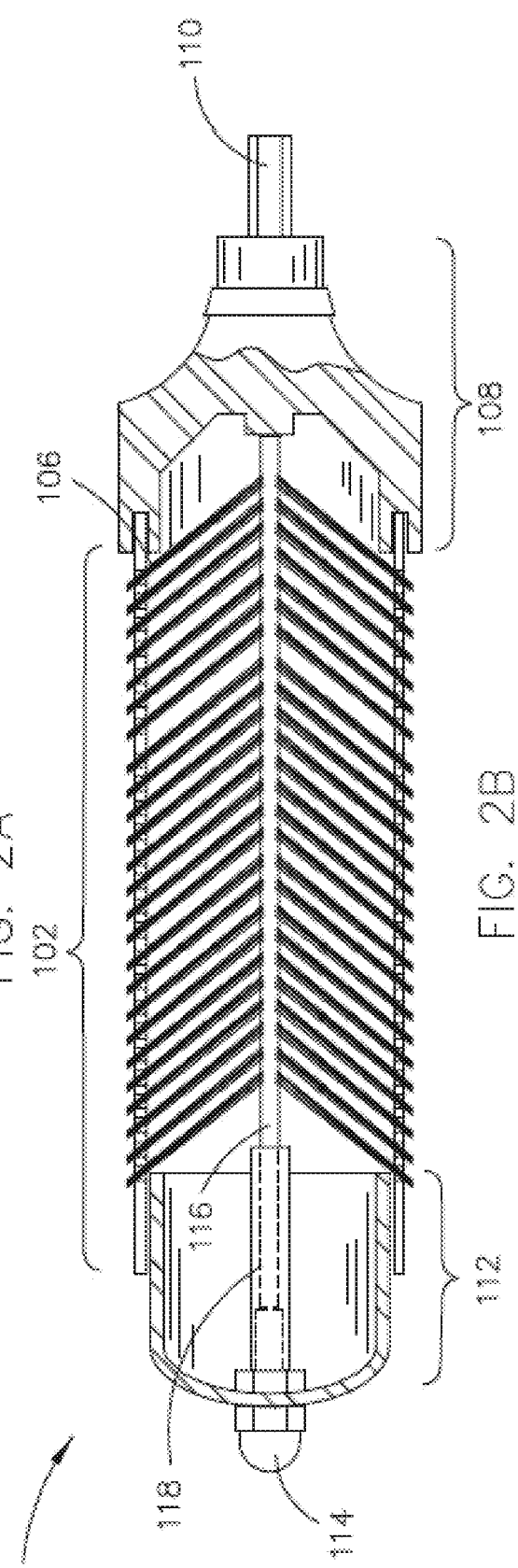

BRUSH WITH RETRACTABLE BRISTLES

CROSS-REFERENCE TO RELATED APPLICATIONS

The present application claims the benefit of U.S. Provisional Application Ser. No. 62/464,088, filed Feb. 27, 2017. The present application herein incorporates U.S. Provisional Application Ser. No. 62/464,088 by reference in its entirety to the extent consistent herewith.

TECHNICAL FIELD

The present invention generally relates to the field of a brush, and, in particular, a brush with retractable bristles.

BACKGROUND

A brush has been utilized for various purposes including styling and detangling human hair, grooming an animal's fur, and cleaning surfaces. As the brush is used several times for the above-mentioned purposes, a significant amount of hair and/or debris is accumulated on bristles of the brush, which impairs the styling and detangling of hair greatly. However, removal of the accumulated hair and/or debris on the bristles of the brush can be a time-consuming task and sometimes difficult. Even after a successful removal and cleaning of the accumulated hair and/or debris on the bristles of the brush, the bristles of the brush are left with residual oil, odor, and/or bacteria from the accumulated hair and/or debris, which cannot be easily cleaned.

Therefore, it would be desirable to provide an apparatus that cures the deficiencies of prior approaches.

SUMMARY

The present disclosure is directed to a brush with retractable bristles, in accordance with one or more embodiments of the present disclosure. In one embodiment, a brush with retractable bristles includes a housing with one or more apertures disposed on a surface of the housing. In some embodiments, the brush with retractable bristles includes a housing base fixedly coupled to a first end of the housing and configured to accept an attachment. In some embodiments, the brush with retractable bristles includes a brush holder configured to be slidably movable within a second end of the housing. In some embodiments, the brush with retractable bristles includes a brush fixedly coupled to a center portion of the brush holder, wherein one or more sets of bristles are radially disposed along the brush.

A motorized brush with retractable bristles is disclosed, in accordance with one or more embodiments of the present disclosure. In one embodiment, the motorized brush with retractable bristles includes a housing with one or more apertures disposed on a surface of the housing. In some embodiments, the motorized brush with retractable bristles includes a housing base fixedly coupled to a first end of the housing. In some embodiments, the motorized brush with retractable bristles includes a brush holder configured to be slidably movable within a second end of the housing. In some embodiments, the motorized brush with retractable bristles includes a brush fixedly coupled to a center portion of the brush holder, wherein one or more sets of bristles are radially disposed along the brush. In some embodiments, the motorized brush with retractable bristles includes an electric tool coupled to the housing base and configured to supply rotational motions to the housing base.

The foregoing is a summary and thus may contain simplifications, generalizations, inclusions, and/or omissions of detail; consequently, those skilled in the art will appreciate that the summary is illustrative only and is not intended to be in any way limiting. Other aspects, features, and advantages of the systems, products and/or methods and/or other subject matter described herein will become apparent in the teachings set forth herein. The accompanying drawings, which are incorporated in and constitute a part of the specification, illustrate embodiments of the disclosure and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 1A illustrates a side view of a brush with retractable bristles in an expanded configuration, in accordance with one or more embodiments of the present disclosure;

FIG. 1B illustrates a side view of a brush with retractable bristles in a retracted configuration, in accordance with one or more embodiments of the present disclosure;

FIG. 2A illustrates a cross-sectional view of the brush with retractable bristles in an expanded configuration corresponding to FIG. 1A, in accordance with one or more embodiments of the present disclosure;

FIG. 2B illustrates a cross-sectional view of the brush with retractable bristles in a retracted configuration corresponding to FIG. 1B, in accordance with one or more embodiments of the present disclosure;

DETAILED DESCRIPTION OF THE INVENTION

Figure 3:
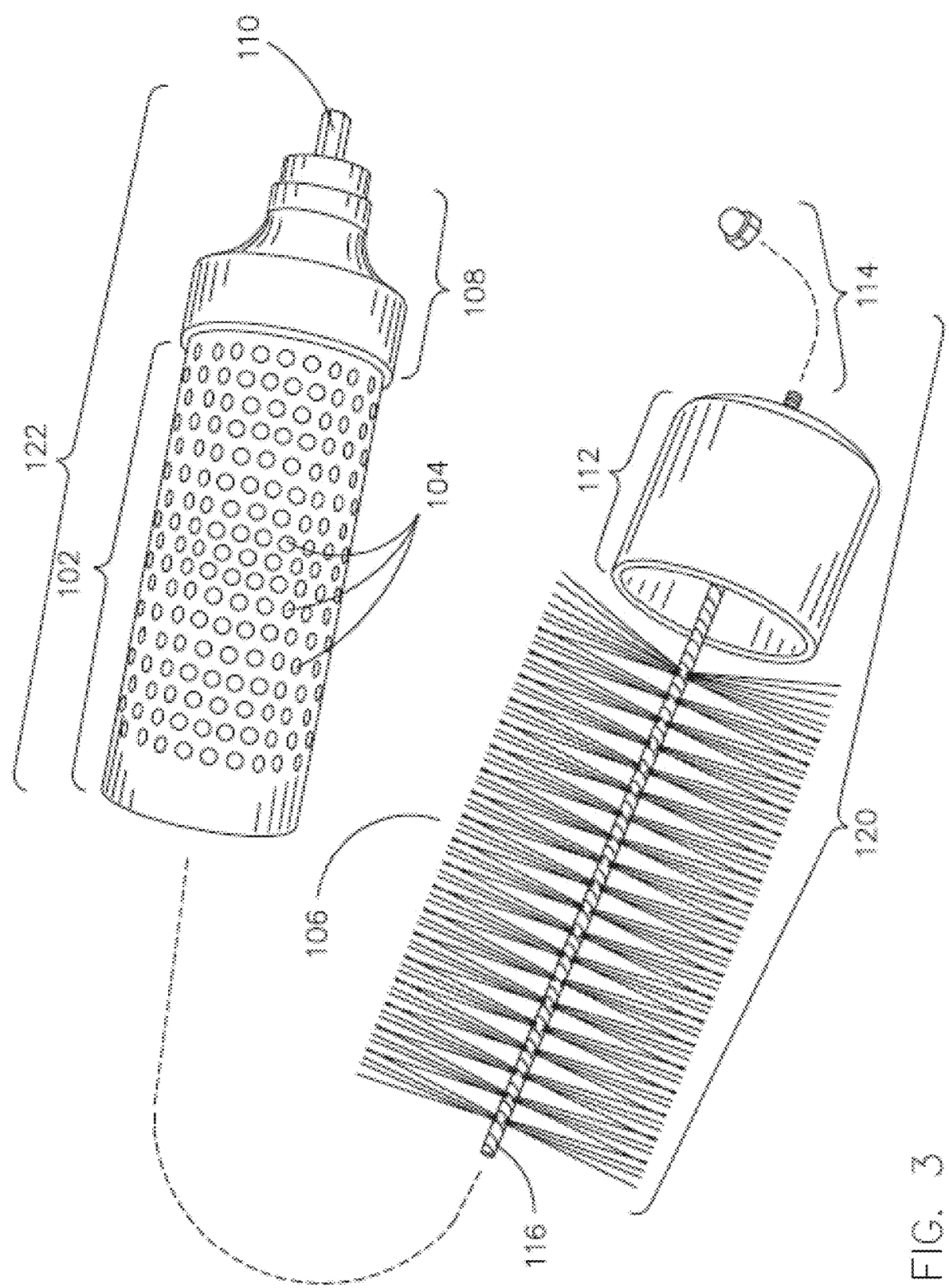
FIG. 3 illustrates an assembly of the brush with retractable bristles, in accordance with one or more embodiments of the present disclosure.

Reference will now be made in detail to the subject matter disclosed, which is illustrated in the accompanying drawings.

Referring generally to FIGS. 1A-4, the present disclosure is generally directed to a brush with retractable bristles. Further, embodiments of the present disclosure are directed to an axially retractable feature of bristles of the brush for an easy cleaning. The axially retractable bristles of the brush in the present disclosure allows for a manual adjustment of a bristle angle and length so as to personalize the brush. Embodiments of the present disclosure further provide an easy replacement of contaminated bristles with new bristles. In addition, embodiments of the present disclosure provide a motorized brush with retractable bristles so as to provide a user-friendly brush equipped with the easy cleaning feature.

FIGS. 1A-4 illustrate a brush with retractable bristles 100, in accordance with one or more embodiments of the present disclosure. FIGS. 1A and 1B illustrate side views of a brush with retractable bristles in an expanded configuration and in a retracted configuration, respectively, in accordance with one or more embodiments of the present disclosure.

Referring now to FIG. 1A, in one embodiment, a retractable brush 100 includes a brush housing 102 (i.e., a housing) having a cylinder shape. For example, an inside of the cylindrical brush housing 102 may be a hollow structure. It is contemplated that, while the brush housing 102 shown in FIGS. 1A and 1B is depicted as a cylinder structure, such a configuration is merely provided for illustrative purposes. Embodiments of the present disclosure may adapt other shapes such as, but are not limited to, a cylindania, rectangular, or the like.

In one embodiment, the retractable brush 100 includes one or more apertures 104 disposed on a surface of the brush housing 102. For example, the one or more apertures 104 may be disposed symmetrically and/or asymmetrically on the surface of the brush housing 102. For instance, symmetrically and/or asymmetrically disposed one or more apertures 104 may occupy a portion of the brush housing surface 102. In another instance, symmetrically and/or asymmetrically disposed one or more apertures 104 may occupy an entire surface of the brush housing 102. In this regard, the one or more apertures 104 disposed on the surface of the brush housing 102 may provide an access to a cavity of the brush housing 102 from outside of the brush housing 102 and vice versa.

In some embodiments, the retractable brush 100 includes one or more apertures 104 disposed on the surface of the brush housing 102 for receiving bristles 106. For example, the one or more apertures 104 may take any shape suitable for receiving the bristles 106 including, but not limited to, a square, circle, oval, or rectangle. The one or more apertures 104 of the brush housing 102 may act as access holes for the bristles 106 to extend outwardly when the bristles 106 of the brush are placed inside the brush housing 102 in an expanded position. In this regard, any aperture shape capable of accepting the bristles 106 may be utilized.

It is noted that, while the apertures 104 disposed on the surface of the brush housing 102 of the retractable brush 100 shown in FIGS. 1A and 1B are depicted to have identical shapes throughout the surface of the brush housing 102, such a configuration is merely provided for illustrative purposes. Embodiments of the present disclosure may be configured to include a combination of different aperture shapes disposed on the surface of the brush housing 102. It is noted further that, while the apertures 104 disposed on the surface of the brush housing 102 of the retractable brush 100 shown in FIGS. 1A and 1B are depicted to have identical sizes throughout the surface of the brush housing 102, such a configuration is merely provided for illustrative purposes. Embodiments of the present disclosure may be configured to include a combination of different aperture sizes disposed on the surface of the brush housing 102. A combination of different sizes and shapes of the apertures 104 on the brush housing 102 may allow for controlling a density and an angle of bristles 106 when the retractable brush 100 is in the expanded position.

In some embodiments, a number of the apertures 104 disposed on the surface of the brush housing 102 may be selected based on a user's preference. For example, the user may select the retractable brush 100 equipped with a small number of the apertures 104 for styling and/or grooming purposes. By way of another example, the user may select the retractable brush 100 equipped with a large number of the apertures 104 for cleaning purposes.

In one embodiment, the retractable brush 100 includes bristles 106 extending outwardly from the one or more apertures 104 disposed on the brush housing 102 in an expanded configuration (i.e., an expanded position) as shown in FIG. 1A. For example, the bristles 106 may be formed from materials known in the art such as, but are not limited to, animal hair brush bristles, vegetable fiber brush bristles, synthetic brush bristles, and/or wire brush bristles. For instance, the bristles 106 formed from the vegetable fiber may include, but not limited to, bass, bassine, kittool, palmetto, palmyra, rice root, Tampico, or the like. In another instance, the bristles 106 formed from synthetic materials may include, but not limited to, carbon fiber, nylon, polyester, polyethylene, polypropylene, polystyrene, polyvinyl chloride (PVC), acrylic fiber, polytetrafluoroethylene (PTFE), or mixture thereof. In yet another instance, the bristles 106 formed from wire bristles may include, but not limited to, brass, aluminum, carbon steel, nickel silver, phosphor bronze, stainless steel, or mixture thereof. In this regard, the material used for the bristles 106 of the retractable brush 100 may be formed from materials that are hard enough to retain the shape when the retractable brush 100 is in the expanded position and flexible enough to be contained within the brush housing 102 when the retractable brush 100 is in the retracted position. Therefore, the materials that possess both hard and flexible characteristics may be utilized for embodiments of the present disclosure and embodiments of the present disclosure may not be limited to the materials listed herein.

In some embodiments, a length of exposed bristles from the one or more apertures 104 and an angle created by planes with the exposed bristles and the brush housing 102 may be changed based on an axial movement of a brush base 112 (i.e., a brush holder) in and out of the brush housing 102, which is described in detail hereinafter. It is noted that, while the length and the angle of the exposed bristles depicted in FIG. 1A is one of configurations that the retractable brush 100 may adapt, such a configuration is merely provided for illustrative purposes. Embodiments of the present disclosure may adapt various lengths of the exposed bristles and angles created by planes with the bristles 106 and the brush housing 102 based on the axial movement of the brush base 112.

In one embodiment, the retractable brush 100 includes a brush housing base 108 (i.e., a housing base) for holding a first end of the brush housing 102. For example, the brush housing base 108 and the brush housing 102 may be a one-piece construction. By way of another example, the brush housing base 108 and the first end of the brush housing 102 may be structurally bonded.

In one embodiment, the retractable brush 100 includes a shaft 110 attached to the brush housing base 108 for receiving an attachment. For example, a first end of the shaft 110 may be attached to a center of an exterior surface of the brush housing base 108. By way of another example, a second end of the shaft 110 may be configured to receive an attachment such as, but not limited to, an electric tool. The electric tool may be used to provide a rotational motion to the brush housing base 108.

In one embodiment, the retractable brush 100 includes a brush base 112 located on a second end of the brush housing 102 for containing a brush assembly inside the brush housing 102. For example, the brush base 112 may be constructed in such a way that a diameter of the brush base 112 is smaller than a diameter of the brush housing 102. This allows for an axial movement of the brush base 112 in and out of the brush housing 102 to control the length and the angle of the bristles 106 exposed from the apertures 104. In this regard, the bristles 106 of the retractable brush 100 may be retracted or expanded by the axial movement of the brush base 112 in and/or out of the brush housing 102.

In some embodiments, the brush base 112 may be used as a second grip for a user to hold the retractable brush 100. For example, the user may hold both an electric tool which is connected and provides a rotational power to the shaft 110 and the brush base 112 so as to stabilize the retractable brush 100 when the brush housing 102 rotates.

In one embodiment, the retractable brush 100 includes a fastener assembly 114 for holding the brush assembly located on an opposite end of the brush base 112 where the second end of the brush housing 102 is faced with the brush base 112. For example, the fastener assembly 114 may be disposed at a center of an exterior surface of the brush base 112.

In some embodiments, the fastener assembly 114 may include any fastener mechanism known in the art capable of securing a structure including, but not limited to, a nut and bolt.

It is noted that the materials used to form the retractable brush 100 may be heat resistant to stand a heat during blowing with a hair dryer. For example, the brush housing 102, the brush housing base 108 and the brush base 112 of the retractable brush 100 may be formed from the heat resistant materials. For instance, the heat resistant materials may include, but are not limited to, heat resistant plastic, metal, and ceramic. Further, it is noted that the materials used to form the retractable brush 100 may be chemical resistant during combing of chemically treated hair. For example, the brush housing 102, the brush housing base 108 and the brush base 112 of the retractable brush 100 may be formed from the chemical resistant materials.

FIG. 1B illustrates the retractable brush 100 in a retracted configuration (i.e., a retracted position), in accordance with one or more embodiments of the present disclosure. In one embodiment, the retractable brush 100 includes the brush housing 102, the apertures 104, the bristles 106, the brush housing base 108, the shaft 110, the brush base 112, and the fastener assembly 114. For example, in the retracted configuration, the bristles 106 of the retractable brush 100 may not be protruded substantially outwardly from the one or more apertures 104 disposed on the surface of the brush housing 102. By way of another example, tips of the bristles 106 may be in a close contact (e.g., slightly protruded from the surface of the brush housing) with the surface of the brush housing 102 in the retracted configuration so as to allow for an easy removal of hair and/or debris from the bristles 106 of the retractable brush 100.

It is noted that the retracted configuration of the retractable brush 100 shown in FIG. 1B may be achieved by an axial movement of the brush base 112 of the retractable brush 100 from the expanded configuration shown in FIG. 1A. It is further noted that a dotted portion of the brush base 112 is the portion of the brush base 112 that is inside the brush housing 102 by the axial movement. It is further noted that the user may keep pushing and holding the brush base 112 of the retractable brush 100 axially into the brush housing 102 of the retractable brush 100 so as to have the bristles 106 of the retractable brush 100 in the retracted configuration. In this regard, once the user stops holding the brush base 112 of the retractable brush 100 axially into the brush housing 102 of the retractable brush 100, the brush base 112 of the retractable brush 100 may move back to an original position and the bristles 106 of the retractable brush 100 may be back in the expanded configuration as shown in FIG. 1A.

FIGS. 2A and 2B illustrate cross-sectional views of the retractable brush 100 in expanded and retracted configurations corresponding to FIGS. 1A and 1B, respectively, in accordance with one or more embodiments of the present disclosure.

Now referring to FIGS. 2A and 2B, in one embodiment, the retractable brush 100 includes the brush housing 102, the apertures 104, the bristles 106, the brush housing base 108, the shaft 110, the brush base 112, and the fastener assembly 114 as described herein. The retractable brush 100 may include a bristle rod 116 (i.e., a brush) equipped with the bristles 106 extending radially, which is placed inside of the brush housing 102. For example, a middle portion of the bristle rod 116 may be utilized for a place to install the bristles 106. By way of another example, a first end of the bristle rod 116 may be an exposed rod. By way of yet another example, a second end of the bristle rod 116 may be connected to a center portion of the brush base 112 with a bristle rod holder 118.

In one embodiment, the retractable brush 100 includes a bristle rod holder 118 for holding the bristle rod 116 securely. For example, the bristle rod holder 118 may be attached at the center of an interior surface of the brush base 112 held with the fastener assembly 114 to orient the bristle rod 116 of the retractable brush 100 at the center of the brush housing 102. For instance, the bristle rod holder 118 may be constructed in such a way that the bristle rod 116 fits into the bristle rod holder 118. It is noted that other methods of removably connecting the bristle rod 116 to the bristle rod holder 118 may be utilized including, but is not limited to, a magnet connection. In this regard, the bristle rod 116 equipped with the bristles 106 may be removable from the bristle rod holder 118. This may allow the user to easily replace contaminated bristles with a bristle rod 116 equipped with clean bristles. This may further allow the user to easily install a bristle rod 116 equipped with various sizes of the bristles so as to tailor the user's requirement (e.g., a human hair brush, an animal hair brush, a cleaning brush, or the like).

In some embodiments, the fastener assembly 114 may include a rolling-element bearing for holding rotating components and reducing friction between the rotating components. In this regard, this may provide a smooth rolling action (e.g., rotational motion) to the bristle rod 116 of the retractable brush 100. For example, the rolling-element bearing of the fastener assembly 114 may include any rolling bearing known in the art capable of reducing friction between the rotating components including, but is not limited to, a ball bearing or roller bearing.

In some embodiments, the rolling-element bearing of the fastener assembly 114 may be disposed on an interior surface of the brush base 112 by an adhesive. For example, the adhesive used to dispose the rolling-element bearing of the fastener assembly 114 onto the interior surface of the brush base 112 may include, but is not limited to a thermoplastic adhesive. This may allow for securing the rolling-element bearing of the fastener assembly 114 onto the interior surface of the brush base 112, which provides a stable smooth rolling action to the bristle rod 116 of the retractable brush 100 when it is in use.

In one embodiment, the retractable brush 100 includes an exposed bristle length $L_1$ defined by a length of the bristles 106 between the apertures 104 of the brush housing 102 and tips of the bristles 106 of the brush 100. For example, the exposed bristle length $L_1$ may be changed based on a length of the bristles 106 of the retractable brush 100. By way of another example, the exposed bristle length $L_1$ may be changed based on how far the brush base 112 may be moved inside or outside of the brush housing 102 by the axial movement. For instance, in an expanded configuration of the retractable brush 100 shown in FIG. 2A, the exposed bristle length $L_1$ may be longer than that in a retracted configuration of the retractable brush 100 shown in FIG. 2B.

It is noted that the bristles 106 on the bristle rod 116 of the retractable brush 100 may be formed in such a way that a length of the bristles 106 on the bristle rod 116 of the retractable brush 100 is longer than a radius of the brush housing 102 of the retractable brush 110.

In some embodiments, the retractable brush 100 includes a gap $L_2$ defined by a length between a tip of the first end of the bristle rod 116 and an interior bottom surface of the brush housing base 108. In an expanded configuration of the retractable brush 100 shown in FIG. 2A, the tip of the first end of the bristle rod 116 may be free of a contact from the interior bottom surface of the brush housing base 108. For example, the gap $L_2$ may be changed based on how far the brush base 112 may be moved inside or outside of the brush housing 102 by the axial movement. For instance, in an expanded configuration of the retractable brush 100 shown in FIG. 2A, the gap $L_2$ may be longer than that in a retracted configuration of the retractable brush 100 shown in FIG. 2B.

It is noted that a brush assembly 120 (i.e., bristles 106, bristle rod 116, bristle rod holder 118, brush base 112, and fastener assembly 114) may not be permanently attached to the brush housing base 108 and the brush housing 102 and may be slidably removable from the brush housing base 108 and the brush housing 102 of the retractable brush 100. It is further noted that a stiffness (i.e., elasticity) of the bristles 106 of the retractable brush 100 may exert a force to keep the first end of the bristle rod 116 from touching the bottom surface of the brush housing base 108. It is further noted that the exerted force generated by the stiffness of the bristles 106 of the retractable brush 100 may work as a force to retrieve the bristle rod 116 of the retractable brush 100 from the retracted configuration shown in FIG. 2B to the expanded configuration shown in FIG. 2A. In this regard, the stiffness of the bristles 106 of the retractable brush 100 may be responsible for holding the brush assembly 120 within a cavity created by the brush housing base 108 and the brush housing 102 of the retractable brush 100.

In some embodiments, the retractable brush 100 includes a bristle angle α defined by an angle created by planes of the bristles 106 and the brush housing 102. The bristle angle α may be between 10° and 170°. For example, the bristle angle α may be changed based on how far the brush base 112 may be moved inside or outside of the brush housing 102 by the axial movement. For instance, in an expanded configuration of the retractable brush 100 shown in FIG. 2A, the bristle angle α may be greater than that in a retracted configuration of the retractable brush 100 shown in FIG. 2B.

It is noted that, while the tips of the bristles 106 of the retractable brush 100 shown in FIG. 2B are slightly protruded above the brush housing 102 through the one or more apertures 104, such a configuration is merely provided for illustrative purposes. Embodiments of the present disclosure may be configured to position the tips of the bristles 106 of the retractable brush 100 completely within the brush housing 102 and orient the tips of the bristles 106 of the retractable brush 100 substantially parallel to the surface of the brush housing 102 so as to retain accumulated hair and/or debris. It is noted that this allows for a non-messy cleanup of the accumulated hair and/or debris from the retractable brush 100.

It is contemplated that a number and an interval of the bristles 106 disposed on the bristle rod 116 of the retractable brush 100 shown in the present disclosure are merely provided for illustrative purposes. Embodiments of the present disclosure may be configured to adapt different numbers and intervals of the bristles. It is further contemplated that, while each of the bristles 106 shown in FIGS. 2A and 2B enter each of the apertures 104 of the brush housing 102, such a configuration is merely provided for illustrative purposes. Embodiments of the present disclosure may adapt other configurations such as, but not limited to, multiple bristles entering one aperture and/or bristles not entering apertures and not protruding above the brush housing 102 via the apertures 104.

Additionally, it is contemplated that, while the retractable brush 100 shown in FIGS. 1A-2B is represented as a round type brush, such a configuration is merely provided for illustrative purposes. Embodiments of the present disclosure may be configured to be utilized in a non-round type brush such as, but not limited to a paddle type brush.

FIG. 3 illustrates an assembly of the retractable brush 100, in accordance with one or more embodiments of the present disclosure. In one embodiment, the retractable brush 100 includes the brush assembly 120 slidably removal from a brush housing assembly 122. For example, the brush assembly 120 may be pulled out axially from the brush housing 102 of the brush housing assembly 122 for replacement of the bristle rod 116 and for cleaning the brush housing assembly 122. This feature of the present disclosure facilitates the user to maintain a cleaner brush as well as to install bristles with different lengths and materials tailored for the user's preference.

Figure 4:
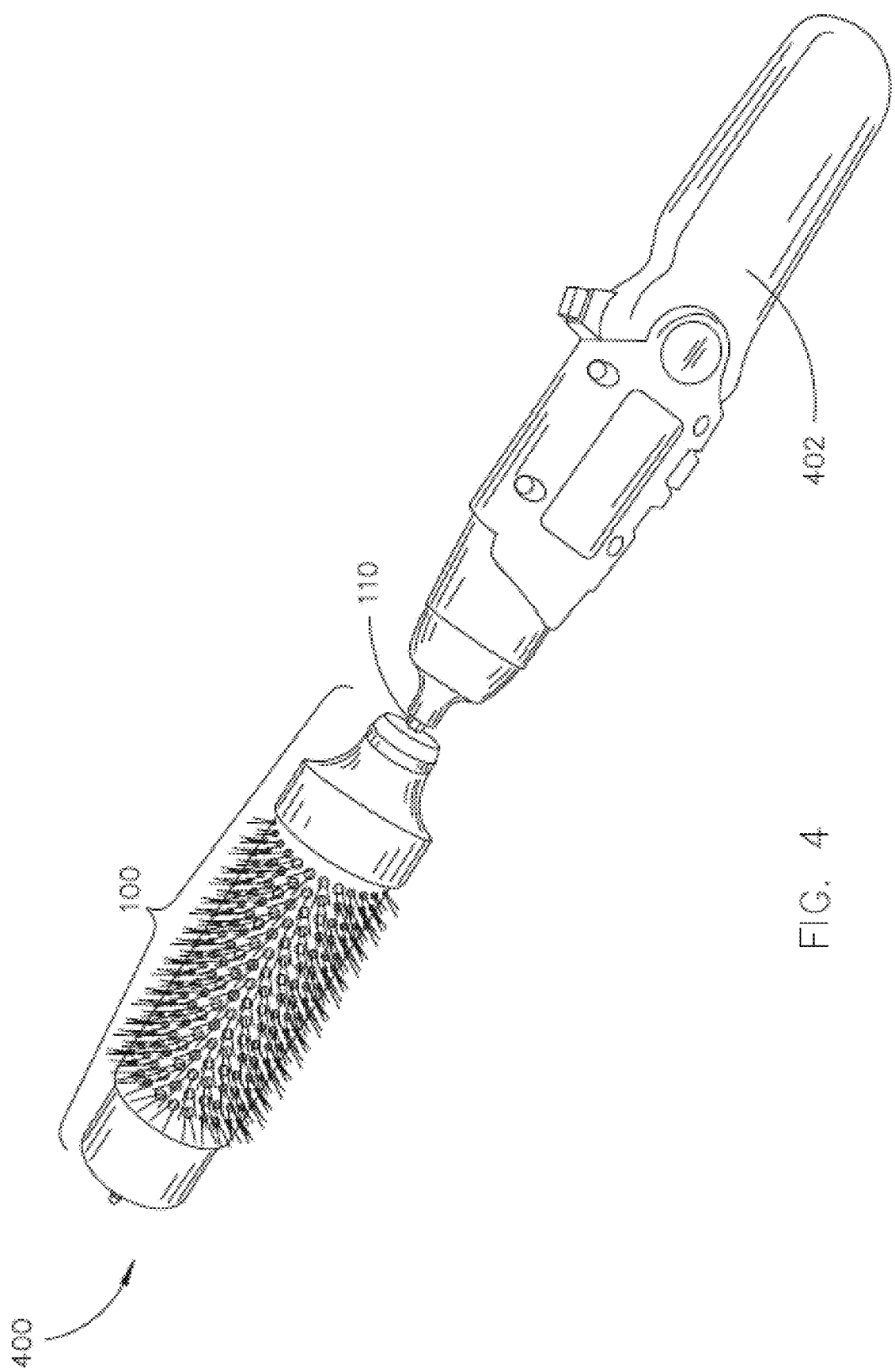
FIG. 4 illustrates a plan view of a motorized brush with retractable brush, in accordance with one or more embodiments of the present disclosure.

FIG. 4 illustrates a plan view of a motorized brush 400 with the retractable brush 100, in accordance with one or more embodiments of the present disclosure. In one embodiment, the shaft 110 of the retractable brush 100 is attached to a motorized tool 402. For example, the motorized tool 402 may rotate the retractable brush 100 in both clockwise and counter-clockwise directions. For instance, the motorized tool 402 may be configured to adjust rotation speed of the retractable brush 100 in both clockwise and counter-clockwise directions so as to tailor the user's preference.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A brush with retractable bristles comprising:
   a housing assembly including:
      a hollow, at least partially tubular, housing having: a first end, a second end, and one or more apertures disposed through a surface of the housing;
      a housing base, fixedly coupled to the first end of the housing, and including a shaft receivable by an attachment;
      the housing further having an inner diameter extending from the first end to the second end thereof, the second end of the housing defining an open end of the housing; and
   a brush assembly including:
      a bristle rod having a first end, a second end, and one or more bristles radially disposed along the bristle rod; and
      a brush base defining a user-actuated button having an at least partially cylindrical hollow configuration having an outside diameter less than the inner diameter of the housing enabling the brush assembly to be removed through the open second end of the housing, the brush base further including a rod holder spaced from an outer wall thereof, the first end of the bristle rod being coupled to the rod holder of the brush base, wherein the second end of the bristle rod is configured to move between a first position in which it is spaced from a contact portion of the housing base and the bristles extend through the one or more apertures in the housing and a second position in which the second end of the bristle rod is in contact with the contact portion of the housing base, to at least partially retract the one or more bristles.

2. The brush with retractable bristles of claim 1, wherein at least a portion of the one or more bristles of the bristle rod are configured to at least partially protrude from the one or more apertures when the second end of the bristle rod is in contact with the contact portion of the housing base.

3. The brush with retractable bristles of claim 1, wherein the one or more bristles are formed from at least one of: one or more metal bristles, one or more fiber bristles, or one or more plastic bristles.

4. The brush with retractable bristles of claim 3, wherein the one or more bristles are heat resistant.

5. The brush with retractable bristles of claim 3, wherein the one or more bristles are chemical resistant.

6. The brush with retractable bristles of claim 1, wherein the brush assembly is configured to rotate in response to a rotation of the housing assembly.

7. The brush with retractable bristles of claim 1, wherein lengths of the one or more bristles are longer than a radius of the housing.

8. A motorized brush with retractable bristles comprising:
   a housing assembly including:
      a hollow, at least partially tubular, housing having: a first end, a second end, and one or more apertures disposed through a surface of the housing;
      a housing base, fixedly coupled to the first end of the housing,
      the housing further having an inner diameter extending from the first end to the second end thereof, the second end of the housing defining an open end of the housing; and
   a brush assembly including:
      a bristle rod having: a first end and a second end and one or more bristles radially disposed along the bristle rod; and
      a brush base defining a user-actuated button having an at least partially cylindrical configuration having an outside diameter less than the inner diameter of the housing enabling the brush assembly to be removed through the open second end of the housing, the brush base further including a rod holder spaced from an outer wall thereof, the first end of the bristle rod being coupled to the rod holder of the brush base; and
   an electric motor coupled to the housing base and configured to supply rotational force to the housing base,
   wherein the second end of the bristle rod is configured to move between a first position where it is spaced from a contact portion of the housing base and the one or more bristles extend through the one or more apertures in the housing and a second position in which the second end of the bristle rod is in contact with the contact portion of the housing base to at least partially retract the one or more bristles.

9. The motorized brush with retractable bristles of claim 8, wherein at least a portion of the one or more bristles of the bristle rod are configured to at least slightly protruded from the one or more apertures of the housing when the second end of the bristle rod is in contact with the contact portion of the housing base.

10. The motorized brush with retractable bristles of claim 8, wherein the one or more bristles are formed from at least one of: one or more metal bristles, one or more fiber bristles, or one or more plastic bristles.

11. The motorized brush with retractable bristles of claim 10, wherein the one or more bristles are heat resistant.

12. The motorized brush with retractable bristles of claim 10, wherein the one or more bristles are chemical resistant.

13. The motorized brush with retractable bristles of claim 8, wherein the bristle rod is configured to be rotatable in response to a rotation of the housing base by the electric motor.

14. The motorized brush with retractable bristles of claim 8, wherein lengths of the one or more bristles are longer than a radius of the housing.

15. A brush with retractable bristles comprising:
   a housing assembly including:
      a hollow, at least partially tubular, housing having: a first end, a second end, and one or more apertures disposed through a surface of the housing;
      a housing base, fixedly coupled to the first end of the housing, and including a user grip portion;
      the housing further having an inner diameter extending from the first end to the second end thereof, the second end of the housing defining an open end of the housing; and
   a brush assembly including:
      a bristle rod having a first end, a second end, and one or more bristles radially disposed along the bristle rod; and
      a brush base defining a user-actuated button having an at least partially cylindrical hollow configuration having an outside diameter less than the inner diameter of the housing enabling the brush assembly to be removed through the open second end of the housing, the brush base further including a rod holder spaced from an outer wall thereof, the first end of the bristle rod being coupled to the rod holder of the brush base, wherein the second end of the bristle rod is configured to move between a first position in which it is spaced from a contact portion of the housing base and the bristles extend through the one or more apertures in the housing and a second position in which the second end of the bristle rod is in contact with the contact portion of the housing base, to at least partially retract the one or more bristles.

* * * * *